(12) United States Patent
Holzapfel

(10) Patent No.: US 11,970,052 B2
(45) Date of Patent: Apr. 30, 2024

(54) DRIVE DEVICE FOR A VEHICLE AXLE OF A VEHICLE

(71) Applicant: AUDI AG, Ingolstadt (DE)

(72) Inventor: Christian Holzapfel, Lenting (DE)

(73) Assignee: AUDI AG, Ingolstadt (DE)

( * ) Notice: Subject to any disclaimer, the term of this patent is extended or adjusted under 35 U.S.C. 154(b) by 263 days.

(21) Appl. No.: 17/419,009

(22) PCT Filed: Jan. 16, 2020

(86) PCT No.: PCT/EP2020/050997
§ 371 (c)(1),
(2) Date: Jun. 28, 2021

(87) PCT Pub. No.: WO2020/164846
PCT Pub. Date: Aug. 20, 2020

(65) Prior Publication Data
US 2022/0111715 A1 Apr. 14, 2022

(30) Foreign Application Priority Data
Feb. 14, 2019 (DE) ................... 10 2019 201 945.5

(51) Int. Cl.
*F16D 11/10* (2006.01)
*B60K 1/00* (2006.01)
(Continued)

(52) U.S. Cl.
CPC ............ *B60K 1/00* (2013.01); *B60K 17/3515* (2013.01); *B60K 17/356* (2013.01); *F16D 11/10* (2013.01);
(Continued)

(58) Field of Classification Search
CPC ...... F16D 11/10; F16D 11/14; F16D 2023/123
See application file for complete search history.

(56) References Cited

U.S. PATENT DOCUMENTS

| 2017/0167544 A1 | 6/2017 | Beesley et al. |
| 2018/0045252 A1* | 2/2018 | Omori ..................... F16D 11/10 |
| 2021/0180654 A1* | 6/2021 | Barrientos Blanco .. B64C 37/00 |

FOREIGN PATENT DOCUMENTS

| DE | 1 575 783 A1 | 8/1969 |
| DE | 102 48 173 A1 | 5/2004 |

(Continued)

OTHER PUBLICATIONS

Examination Report dated Oct. 7, 2019 in corresponding German application No. 10 2019 201 945.5; 14 pages including Machine-generated English-language translation.
(Continued)

*Primary Examiner* — Stacey A Fluhart
(74) *Attorney, Agent, or Firm* — Maier & Maier, PLLC

(57) ABSTRACT

A drive device for a vehicle axle of a two-track vehicle having a drive unit having in particular an electric machine, which outputs on the output side on at least one driveshaft leading to a vehicle wheel, which driveshaft is divided into a wheel-side shaft section and an axle-side shaft section which can be coupled to one another or decoupled from one another in a driving manner by means of a formfitting clutch, in order to avoid drag losses in the deactivated drive unit in driving operation with deactivated drive unit.

13 Claims, 5 Drawing Sheets

(51) Int. Cl.
  *B60K 17/35*   (2006.01)
  *B60K 17/356*  (2006.01)
  *F16D 11/14*   (2006.01)
  *F16D 28/00*   (2006.01)

(52) U.S. Cl.
  CPC .............. *F16D 11/14* (2013.01); *F16D 28/00* (2013.01); *B60K 2001/001* (2013.01)

(56) References Cited

FOREIGN PATENT DOCUMENTS

| DE | 10 2009 026 710 A1 | 12/2010 |
| DE | 202015000397 U1 | 5/2015 |
| DE | 10 2015 105 135 A1 | 10/2016 |
| DE | 10 2015 206 129 A1 | 10/2016 |
| DE | 10 2015 210 227 A1 | 12/2016 |
| DE | 10 2016 224 864 A1 | 6/2017 |
| DE | 10 2018 114 626 A1 | 12/2018 |
| DE | 11 2017 006 070 T5 | 8/2019 |
| DE | 102018213163 A1 * | 2/2020 |
| EP | 3 112 204 A1 | 1/2017 |
| GB | 1 509 397 A | 5/1978 |

OTHER PUBLICATIONS

Examination Report dated Mar. 5, 2021 in corresponding German application No. 10 2019 201 945.5; 12 pages including Machine-generated English-language translation.

International Search Report dated Apr. 3, 2020 in corresponding International application No. PCT/EP2020/050997; 7 pages.

Written Opinion of the International Searching Authority dated Apr. 3, 2020 in corresponding International application No. PCT/EP2020/050997; 17 pages.

International Preliminary Report on Patentability dated Aug. 10, 2021 in corresponding International application No. PCT/EP2020/050997; 17 pages.

\* cited by examiner

DRIVE DEVICE FOR A VEHICLE AXLE OF A VEHICLE

FIELD

The invention disclosure relates to a drive device for a vehicle axle of a two-track vehicle.

BACKGROUND

In a generic all-wheel-drive vehicle having electric drive, the front axle and the rear axle can have at least one electric machine independently of one another. Depending on driving operation, for example, the electric machine of the front axle can be non-energized and solely the electric machine of the rear axle can be energized, so that the vehicle is only driven using the rear axle. In this way, the overall efficiency is increased and the range is extended. However, in the case of such a purely rear axle operation, friction losses occur (air friction and bearing friction, gear teeth friction in the transmission, splashing losses, etc.) due to the entrained, deactivated front axle drive.

A drivetrain for a motor vehicle having a clutch-controlled all-wheel-drive is known from DE 10 2015 210 227 A1. An actuating device for a claw clutch is known from DE 20 2015 000 397 U1. An electromagnetic clutch is known from DE 1 575 783 A.

SUMMARY

The object of the invention is to provide a drive device for a vehicle axle of a vehicle, which is electrically operated in particular, with which, in driving operation, drag losses in a deactivated drive unit can be reduced.

According to the invention, the drive unit outputs on the output side on at least one driveshaft leading to a vehicle wheel. According to the characterizing part of claim 1, this driveshaft is divided into a wheel-side shaft section and into an axle-side shaft section, which can be coupled to one another or decoupled from one another in a driving manner by means of a formfitting clutch. In the decoupled state, torque transmission does not occur between the wheel-side shaft section and the axle-side shaft section so that in driving operation and with deactivated drive unit, drag losses can be avoided in the deactivated drive unit. In this way, for example, a vehicle axle (especially the front axle) can be coupled or decoupled as needed, preferably independently of the driving state.

In a technical implementation, the formfitting clutch has a sliding collar, which is arranged in a rotationally-fixed, but axially displaceable manner on plug-in gear teeth of a first shaft section. The sliding collar can be displaceable by means of an axial positioning force generated by an actuator between an open clutch state, in which the sliding collar is moved out of formfitting connection to the second shaft section, and a closed clutch state, in which the sliding collar is moved into formfitting connection with the second shaft section.

With regard to the high package density in the region of the vehicle axle, a compact implementation, which is reduced in installation space, of the formfitting clutch including actuator is of great significance. Against this background, an actuator sleeve can be associated with the actuator, which is arranged on a cylindrical sliding collar outer circumference. For the rotational decoupling from the sliding collar, which rotates in operation, the actuator sleeve can be mounted via at least one roller bearing on the sliding collar outer circumference, specifically so that the axial positioning force generated by the actuator is introduced via the rotationally-decoupled actuator sleeve and the roller bearing into the sliding collar.

In a first embodiment variant, for a positioning force transmission, both the bearing outer ring of the roller bearing can be attached to the actuator sleeve to transmit positioning force and also the bearing inner ring of the roller bearing can be attached to the sliding collar to transmit positioning force.

The above actuator sleeve can be adjusted by means of the actuator between an open position, in which the formfitting clutch is open, and a closed position. For this purpose, the actuator can interact via a gearing step with the actuator sleeve. In an implementation advantageous for installation space, this gearing step can have outer gear teeth on the cylindrical sliding collar outer circumference. The teeth are spaced apart from one another in the axial direction in the outer gear teeth and are in tooth engagement with a gear wheel of an actuator shaft of an electric motor, which forms the actuator.

A formfitting clutch is preferably embodied as a claw clutch, in which the sliding collar and the second shaft section have wheel-side and axle-side shifting claws facing toward one another axially. The cylindrical sliding collar outer circumference can merge into the larger-diameter shifting claws while forming an inner corner region. The actuator sleeve can be situated in a manner favorable for installation space in the inner corner region thus formed.

During the closing procedure of the above claw clutch, the wheel-side and axle-side shifting claws can be opposite to one another tooth on gap in the axial direction, so that a smooth formfitting coupling can take place. In the more probable case, in contrast, first the shifting claws come into contact tooth on tooth during the closing procedure. From reaching the contact tooth on tooth, according to the invention the actuator sleeve is adjusted further into its closed position, specifically while building up a spring force of an overload spring acting axially on the shifting claws, by means of which the wheel-side and axle-side shifting claws are clamped against one another. As soon the shifting claws are brought into a relative location tooth on gap by a slight relative angle pivot of the two clutch halves, the wheel-side and axle-side shifting claws can establish a formfitting connection with dissipation of the spring force.

In one technical implementation, the wheel-side shifting claws can be formed on a carrier ring, which is arranged in a rotationally-fixed and axially-displaceable manner on the wheel-side shaft section via plug-in gear teeth. The carrier ring can be supported on its side axially opposite to the axle-side shaft section via the above-mentioned overload spring against an axial stop of the wheel-side shaft section. Therefore, if the wheel-side and axle-side shifting claws come into a contact tooth on tooth during the closing procedure of the claw clutch, the actuator sleeve including sliding collar is adjusted into the closed position, so that the sliding collar adjusts the carrier ring by a compensation stroke on the wheel-side shaft section while building up the spring force. As soon as tooth stands on gap due to a slight relative angle pivot of the two clutch halves, the formfitting connection takes place, during which the wheel-side carrier ring establishes a formfitting connection with the axle-side shifting claws while consuming the above compensation stroke and while dissipating the spring force.

A second embodiment variant is described hereinafter, in which the actuator sleeve is no longer seated on the bearing outer ring of the roller bearing to transmit positioning force, but rather is seated so it is axially displaceable on the bearing outer ring of the roller bearing. The bearing inner ring of the roller bearing remains axially fixed and rotationally fixed as before, that is to say arranged on the sliding collar to transmit positioning force. A ring gap, in which the overload spring is arranged, can be provided between the actuator sleeve and the cylindrical sliding collar outer circumference. The overload spring is supported in the axial direction between an actuator sleeve axial stop and the roller bearing bearing outer ring. During the closing procedure, the actuator sleeve and the sliding collar can thus be adjusted in a movement-coupled manner until reaching a contact tooth on tooth. From reaching the contact tooth on tooth, the actuator sleeve is adjusted in a movement-decoupled manner from the sliding collar further into its closed position, specifically while building up the spring force of the overload spring. Due to a slight relative angle pivot of the two clutch halves, the shifting claws can be brought into a relative location tooth on gap, so that the sliding collar is brought into formfitting connection together with axle-side shifting claws formed thereon while dissipating the spring force of the overload spring.

Two exemplary embodiments of the invention are described hereinafter on the basis of the appended figures.

DETAILED DESCRIPTION

Figure 1:
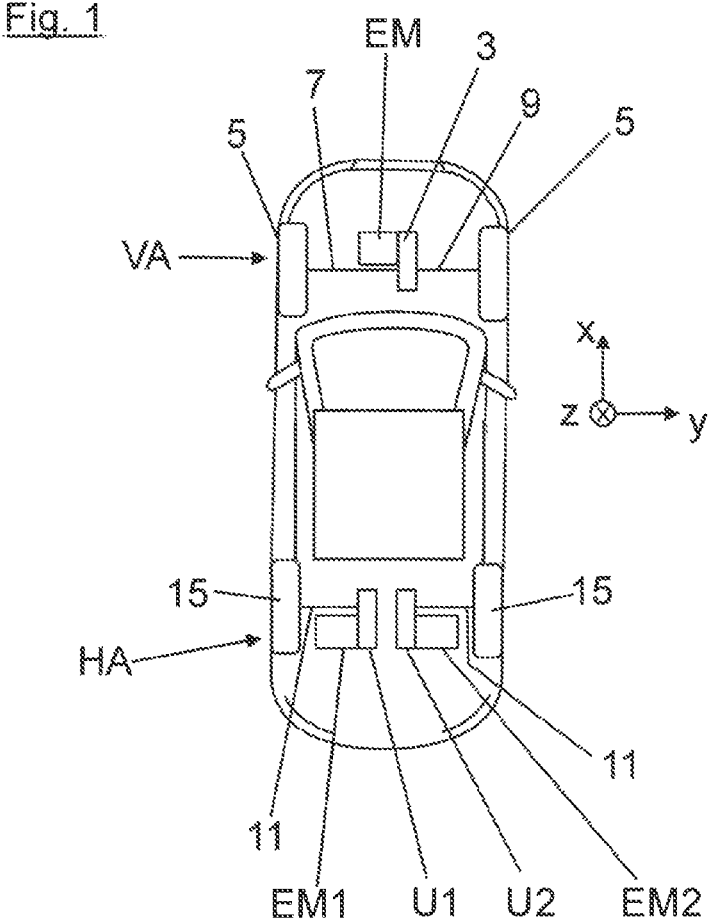
FIG. 1 shows a rough schematic illustration of an electrically operated motor vehicle from above with highlighted, schematically shown vehicle axles.

An electrically operated motor vehicle is shown in FIG. 1, which has an electrically drivable front axle VA and an electrically drivable rear axle HA. The front axle VA is equipped with precisely one electric machine EM, which outputs via a front axle differential 3 onto the left and right driveshafts 7, 9 leading to the right and left front wheel 5. The rear axle HA has a drive device, in which, in contrast to the front axle VA, one electric machine EM1, EM2 is associated with each of the rear wheels 15, which electric machines are connected in a driving manner via transmission steps U1, U2 to the driveshafts 11 of the rear axle HA. As can furthermore be seen from FIG. 1, the front right driveshaft 9 is divided into a wheel-side shaft section 17 and into an axle-side shaft section 19, which can be coupled to or decoupled from one another by means of a claw clutch 21.

With open claw clutch 21, therefore only a no-load compensation movement of the compensation bevel gears 29 in the front axle differential 3 therefore remains in driving operation. The remainder of the driving unit (that is to say transmission and electric machine) come to a standstill, in contrast, so that friction losses are strongly reduced.

For coupling (i.e., during the closing of the claw clutch 21), first the electric machine EM is energized and thus the displaceable part of the claw clutch 21 is synchronized to the present wheel speed. If synchronization is nearly achieved, the actuator 49 is activated. As described later, the actuator 49 acts via gear teeth on a non-rotating actuator sleeve 53. This presses via a spring-ball bearing combination on the displaceable part of the claw clutch 21.

Figure 2:
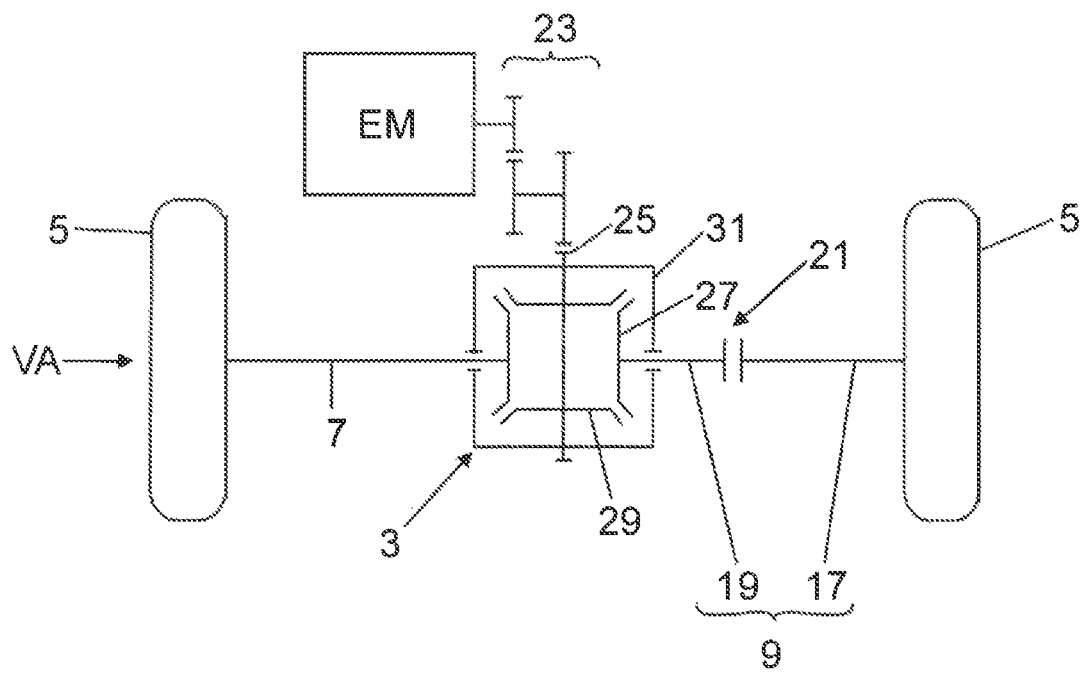
FIG. 2 shows a drive device for the front axle of the vehicle.

According to FIG. 2, the electric machine EM of the front axle VA is connected in a driving manner via a reduction gearing 23 to an input-side outer gear wheel 25 of the front axle differential 3. On the output side of the front axle differential 3, axle bevel gears 27 are connected to the two driveshafts 7, 9. The axle bevel gears 27 and compensation bevel gears 29 meshed therewith are positioned inside a compensation housing 31 of the axle differential 3.

Figure 3:
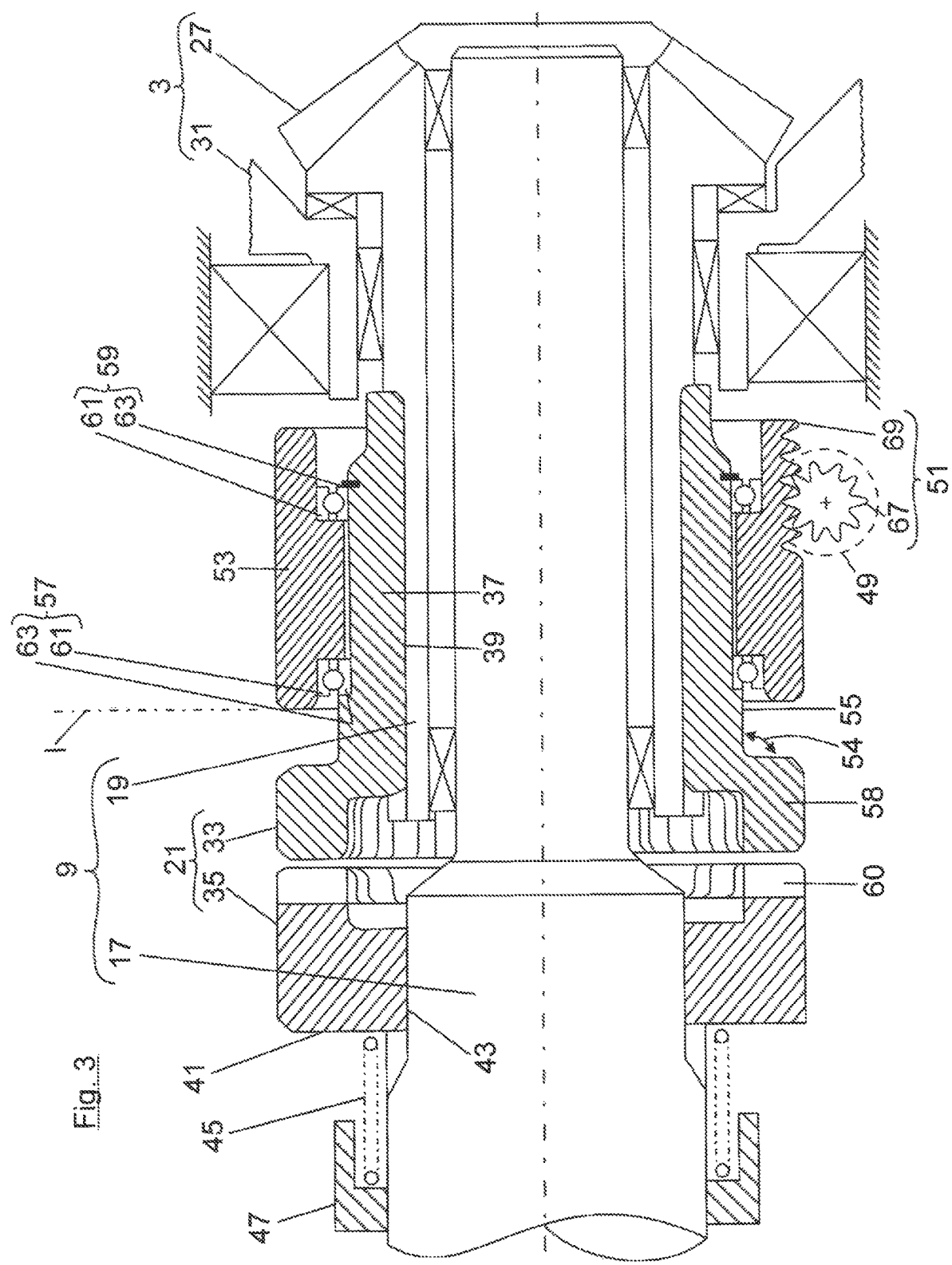
FIG. 3 shows a partial view of a first exemplary embodiment of a claw clutch, which is shown in the open clutch state.

The structure and the mode of operation of the claw clutch 21 according to a first exemplary embodiment is described hereinafter on the basis of FIGS. 3 and 4. In FIG. 3, the axle bevel gear 27 is extended using an axle hollow shaft, which forms the axle-side shaft section 19. A plug-in shaft, which forms the wheel-side shaft section 17, led to the front wheel 5 is rotationally mounted radially inside the axle hollow shaft 19. The claw clutch 21 has axle-side shifting claws 33 and wheel-side shifting claws 35 in FIG. 3, which are in a formfitting connection with one another when claw clutch 21 is closed. The axle-side shifting claws 33 are part of a sliding collar 37 in FIG. 3, which is arranged in a rotationally-fixed, but axially-displaceable manner on plug-in gear teeth 39 of the axle hollow shaft 19. The wheel-side shifting claws 35 are formed on a carrier ring 41, which is mounted in a rotationally-fixed, but axially-displaceable manner via plug-in gear teeth 43 on the plug-in shaft 17. The carrier ring 41 is supported on its side axially opposite to the axle hollow shaft 19 by means of an overload spring 45 against an axial stop 47 of the plug-in shaft 17.

The sliding collar 37 arranged in an axially-displaceable manner on the axle hollow shaft 19 is actuatable in FIG. 3 via an actuator 49, which is implemented as an electric motor. The actuator 49 is in a driving connection with an actuator sleeve 53 via a gearing step 51. The actuator sleeve is arranged on a cylindrical sliding collar outer circumference 55. For rotational decoupling from the sliding collar 37, which rotates in operation, the actuator sleeve 53 is mounted via two roller bearings (alternately also plain bearings) 57, 59 on the cylindrical sliding collar outer circumference 55. In FIG. 3, a bearing outer ring 61 of the roller bearings 57, 59 is pressed into the inner circumference of the actuator sleeve 53, i.e., attached to the actuator sleeve 53 to transmit positioning force. Moreover, a bearing inner ring 63 of the roller bearing 57, 59 is pressed onto the sliding collar outer circumference 55, i.e., attached to the sliding collar 37 to transmit positioning force. In this way, an axial positioning force $F_S$ generated by the actuator 49 is introduced via the rotation-decoupled actuator sleeve 53 and further via the two roller bearings 57, 59 into the sliding collar 37.

The gearing step 51 connected between the actuator 49 and the actuator sleeve 53 is formed in FIG. 3 by a drive gear wheel 67 formed on an actuator shaft, which is in tooth engagement with outer gear teeth 69 on the outer circumferential side of the sliding collar 37. The outer gear teeth 69 have teeth spaced apart from one another in the axial direction.

A closing procedure of the claw clutch 21 is described hereinafter on the basis of FIG. 3, in which the wheel-side and axle-side shifting claws 33, 35 are axially opposite to one another tooth 58 on gap 60. In this case, the actuator 49 is activated to displace the actuator 53 together with the sliding collar 37 movement-coupled thereto from the illustrated open position I into a closed position S, in which the wheel-side and axle-side shifting claws 33, 35 are brought smoothly into engagement.

Figure 4:
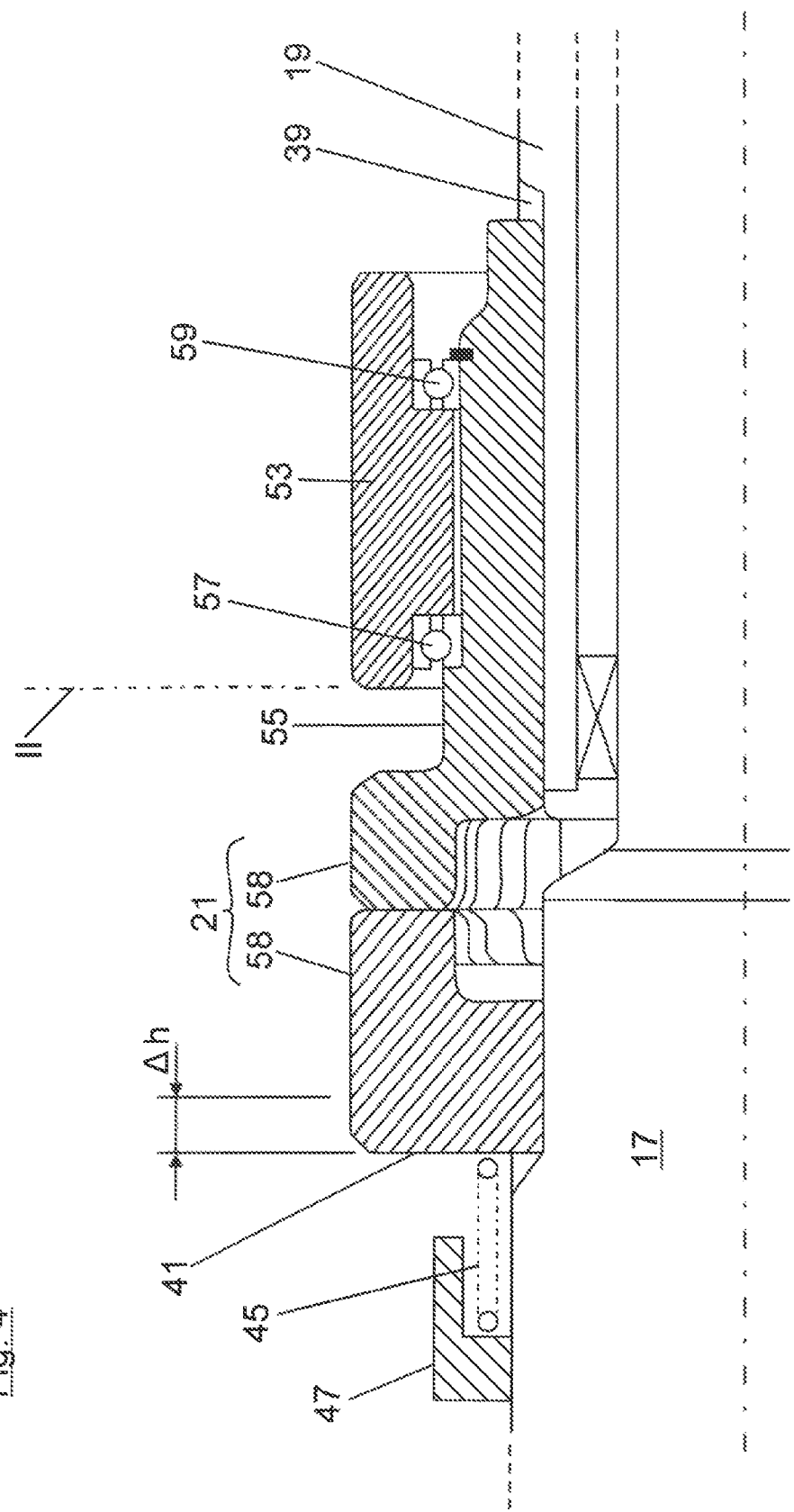
FIG. 4 shows a view corresponding to FIG. 3, on the basis of which a closing procedure of the claw clutch is illustrated.

A closing procedure is described on the basis of FIG. 4, in which the wheel-side and axle-side shifting claws 33, 35 are not axially opposite to one another tooth 58 on gap 60, but rather are opposite to one another tooth 58 on tooth 58. In this case, during the closing procedure, the wheel-side and axle-side shifting claws 33, 35 first come into contact tooth 58 on tooth 58. From reaching the contact tooth 58 on tooth 58 (FIG. 4), the actuator sleeve 53 together with sliding collar 37 is adjusted farther by an overload stroke Δh (not shown in FIG. 4) into the closed position II, wherein the carrier ring 41 is displaced by the overload stroke h on the plug-in shaft 17 while building up a spring force of the overload spring 45. As soon as tooth 58 is opposite to gap 60 due to a slight relative angle pivot, the carrier ring 41 is brought suddenly into formfitting connection with the axle-side shifting claws 33 of the sliding collar 37 while consuming the overload stroke Δh and while dissipating the spring force of the overload spring 45.

Figure 5:
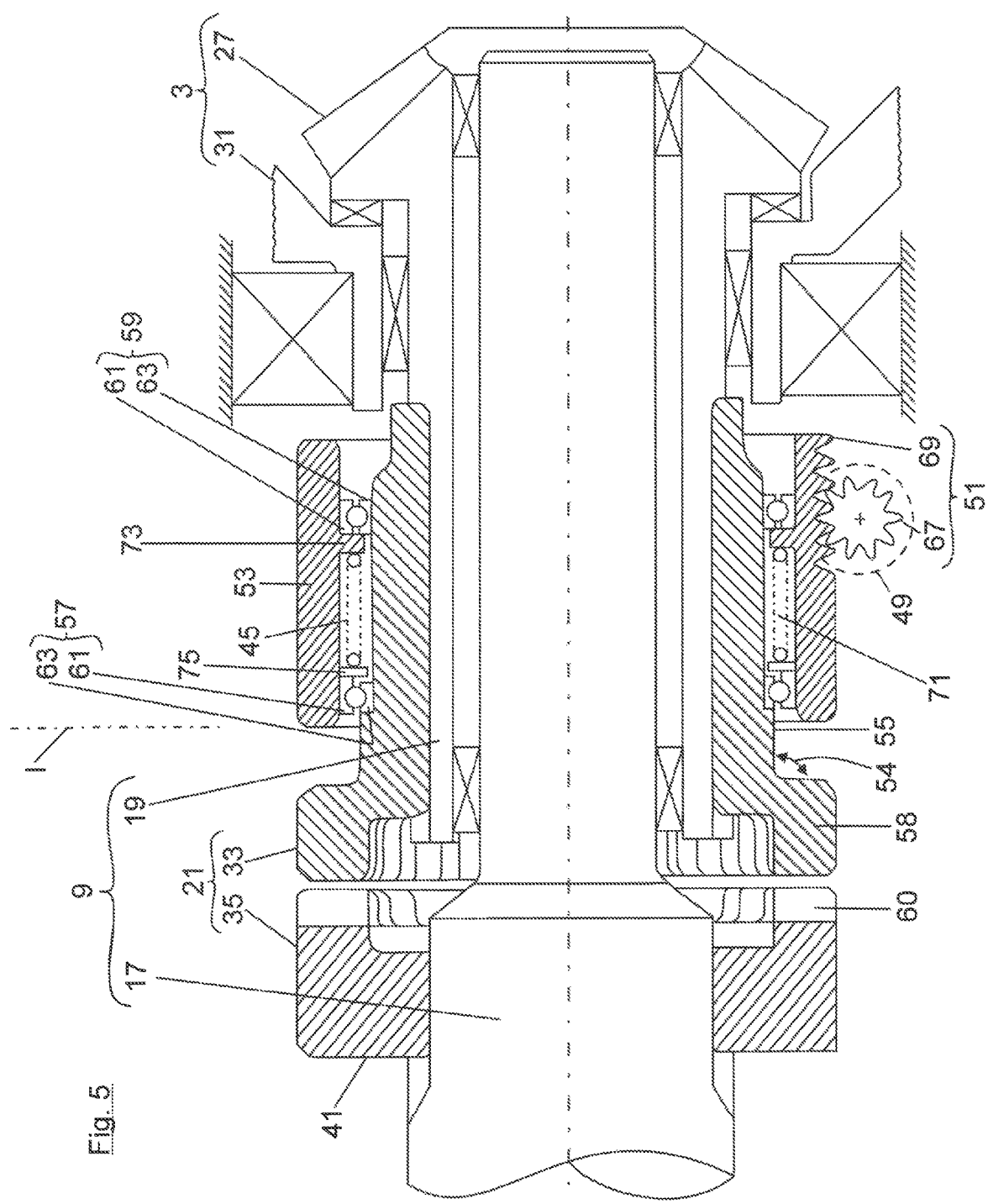
FIG. 5 show a views corresponding to FIG. 3 on the basis of which the mode of operation of the overload spring is illustrated.
Figure 6:
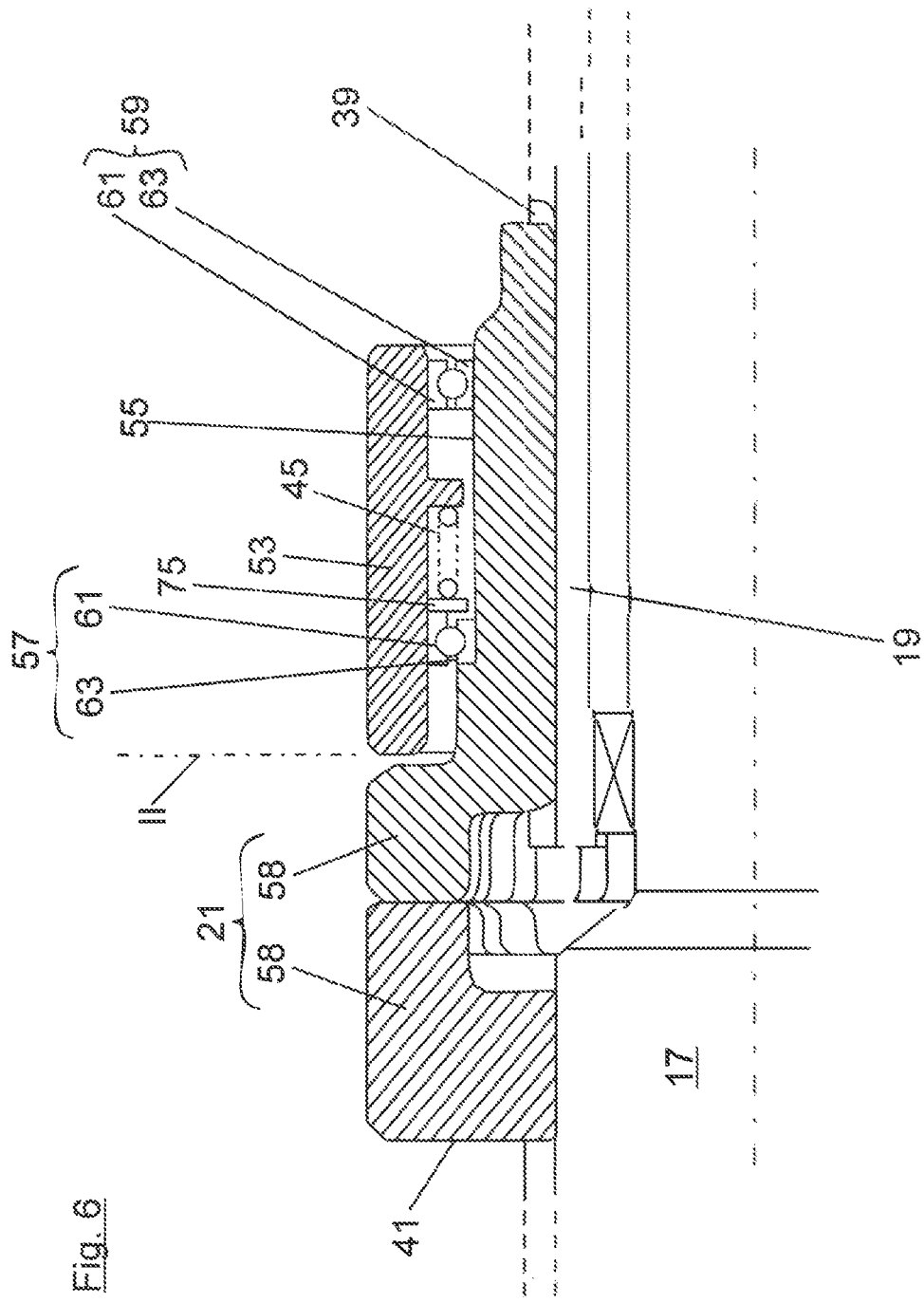
FIG. 6 show a view corresponding to FIG. 4 on the basis of which the mode of operation of the overload spring is illustrated.

A second exemplary embodiment is shown in FIGS. 5 and 6, in which the carrier ring 41 is pressed onto the plug-in shaft 17 no longer in an axially-displaceable manner, but rather in an axially-fixed and rotationally-fixed manner. The overload spring 45 is arranged in FIG. 7 in a ring gap 71 between the actuator sleeve 53 and the cylindrical sliding collar outer circumference 55.

In contrast to the first exemplary embodiment, in FIG. 5, the actuator sleeve 53 is no longer arranged to transmit positioning force, but rather in an axially-displaceable manner on the bearing outer ring 61 of the respective roller bearing 57, 59. The bearing inner ring 63 of the roller bearing 57, 59 is still positioned in an axially-fixed and rotationally-fixed manner, that is to say to transmit positioning force, on the sliding collar 37. The overload spring 45 is supported in FIG. 5 in the axial direction between an axial stop 73 of the actuator sleeve 53 and an intermediate disk 75. This is positioned loosely within the ring gap 71 and presses against the bearing outer ring 61 of the roller bearing 57.

A closing procedure of the claw clutch 21 shown in FIG. 5 is described hereinafter. In FIG. 5, the wheel-side and axle-side shifting claws 33, 35 are opposite to one another tooth 58 on gap 60, so that the actuator sleeve 53 together with the sliding collar 37 are adjustable smoothly into the closed position II in a movement-coupled manner, to establish a formfitting connection between the axle-side and wheel-side shifting claws 33, 35.

A closing procedure is illustrated on the basis of FIG. 6, in which the shifting claws 33, 35 are opposite to one another tooth 58 on tooth 58. In this case, during the closing procedure, the actuator sleeve 53 together with sliding collar 37 is first adjusted in a movement-coupled manner, specifically until reaching the contact tooth 58 on tooth 58 (FIG. 6). From reaching the contact tooth 58 on tooth 58 (FIG. 6), the actuator sleeve 53 is adjusted further into its closed position II by the overload stroke Δh—in a movement-decoupled manner from the sliding collar 37—specifically while building up the spring force of the overload spring 45. The shifting claws 33, 35 are moved by a slight relative angle pivot into a relative location tooth 58 on gap 60, so that the shifting claws 33, 35 can be moved suddenly into formfitting connection while dissipating the spring force.

For the coupling (closing procedure), first the electric machine EM is energized and thus the displaceable part of the clutch is synchronized to wheel speed. If synchronization is nearly reached, the actuator 49 is activated, which acts via gear teeth on the nonrotating actuator sleeve 53. This presses via a spring-ball bearing combination on the displaceable part of the claw clutch.

LIST OF REFERENCE SIGNS 3 front axle differential
5 front wheels
7, 9 driveshafts of the front axle
11 driveshafts of the rear axle
15 rear wheels
17 wheel-side shaft section
19 axle-side shaft section
21 claw clutch
23 reduction gearing
25 outer gear wheel
27 axle bevel gears
29 compensation bevel gears
31 compensation housing
33 axle-side shifting claws
35 wheel-side shifting claws
37 sliding collar
39 plug-in gear teeth
41 carrier ring
43 plug-in gear teeth
45 overload spring
47 axial stop
49 actuator
51 transmission step
53 actuator sleeve
54 inner corner region
55 cylindrical sliding collar outer circumference
57, 59 roller bearing
61 bearing outer ring
63 bearing inner ring
67 drive gear wheel
69 outer gear teeth
71 ring gap
73 axial stop
75 intermediate disk
EM, EM1, EM2 electric machines
U1, U2 transmission steps
Δh overload stroke
I open position
II closed position

The invention claimed is:

1. A device for a vehicle axle (VA) of a two-track vehicle comprising:
   a drive unit having an electric machine (EM), which is configured to outputs on the output side on at least one driveshaft leading to a vehicle wheel, wherein the at least one driveshaft is divided into a wheel-side shaft section and an axle-side shaft section which are configured to be coupled to one another or decoupled from one another by means of a formfitting clutch;
   an actuator sleeve, seated in an axially-displaceable manner on a bearing outer ring of a roller bearing;
   an actuator in a driving connection with the actuator sleeve; and
   a bearing inner ring of the roller bearing seated in an axially-fixed and rotationally-fixed manner.

2. The drive device as claimed in claim 1, wherein the sliding collar and the second shaft section have wheel-side and axle-side shifting claws facing toward one another axially, and in that the cylindrical sliding collar outer circumference merges into the larger-diameter shifting claws while forming an inner corner region, and in that the actuator sleeve is arranged in the inner corner region.

3. The drive device as claimed in claim 2, wherein during the closing procedure, the shifting claws come into contact tooth on tooth, and, after reaching the contact tooth on tooth, the actuator sleeve is configured to be adjusted further into the closed position, while building up a spring force of an overload spring acting axially on the shifting claws, which axially tensions the shifting claws against one another, and the shifting claws are configured to be moved into the tooth on the gap so that the shifting claws come into a formfitting connection while dissipating the spring force.

4. The drive device as claimed in claim 3, wherein a ring gap, in which the overload spring is arranged, is provided between the actuator sleeve and the cylindrical sliding collar outer circumference, the overload spring is configured to be supported in the axial direction between an axial stop of the actuator sleeve and the bearing outer ring of the roller bearing, that during the closing procedure until reaching the contact tooth on tooth, the actuator sleeve and the sliding collar are configured to be adjusted in a movement-coupled manner, and after from reaching the contact tooth on tooth, the actuator sleeve is configured to be adjusted further into the closed position in a manner movement-decoupled from the sliding collar while building up the spring force of the overload spring.

5. The drive device as claimed in claim 2, wherein the wheel-side shifting claws are formed on a carrier ring, which is arranged in a rotationally-fixed and axially-displaceable manner on the wheel-side shaft section, the carrier ring is supported on its side axially opposite to the axle-side shaft section by an overload spring against an axial stop of the wheel-side shaft section, and, upon contact tooth on tooth, the actuator sleeve together with the sliding collar is configured to be adjusted into a closed position, so that the sliding collar adjusts the carrier ring on the wheel-side shaft section by an overload stroke (Δh) while building up a spring force.

6. The drive device as claimed in claim 3, wherein the wheel-side shifting claws are formed on the carrier ring is supported on its side axially opposite to the axle-side shaft section by means of the overload spring against an axial stop of the wheel-side shaft section, and, upon contact tooth on tooth, the actuator sleeve together with the sliding collar is configured to be adjusted into the closed position, so that the sliding collar adjusts the carrier ring on the wheel-side shaft section by an overload stroke (Δh) while building up the spring force.

7. A device for a vehicle axle (VA) of a two-track vehicle comprising:
a drive unit having an electric machine (EM), which is configured to output on the output side on at least one driveshaft leading to a vehicle wheel, wherein the at least one driveshaft is divided into a wheel-side shaft section and an axle-side shaft section which is configured to be coupled to one another or decoupled from one another by means of a formfitting clutch,
an actuator sleeve, arranged on a cylindrical sliding collar outer circumference, associated with an actuator;
a carrier ring, arranged in a rotationally-fixed and axially-displaceable manner on the wheel-side shaft section,
a drive gear wheel formed on an actuator shaft, which is in tooth engagement with outer gear teeth on an outer circumferential side of a sliding collar,
wherein the sliding collar, is arranged in a rotationally-fixed, but axially-displaceable manner on the axle-side shaft section, and the sliding collar is configured to be displaceable by means of a positioning force generated by an actuator between:
an open clutch state, in which the sliding collar is moved out of a formfitting connection with the axle-side shaft section, and
a closed clutch state, in which the sliding collar is moved into a formfitting connection with the wheel-side shaft section.

8. The drive device as claimed in claim 7, wherein the actuator sleeve, configured to be mounted on the sliding collar outer circumference for rotational decoupling from the sliding collar, which rotates in driving operation, so that the positioning force generated by the actuator is introduced via the actuator sleeve and the rotating bearing into the sliding collar, and, for positioning force transmission, a bearing outer ring of the rotating bearing is attached to the actuator sleeve to transmit the positioning force and a bearing inner ring of the rotating bearing is attached to the sliding collar to transmit the positioning force.

9. The drive device as claimed in claim 8, -wherein the actuator sleeve is configured to be adjustable by of the actuator between:
an open position, in which the formfitting clutch is open, and
a closed position, in that in which the actuator is configured to interacts via with the actuator sleeve, and outer gear teeth are formed on the outer circumferential side of the sliding collar, which have teeth spaced apart from one another in the axial direction, which are in tooth engagement with a gear wheel of an actuator shaft of an electric motor.

10. The drive device as claimed in claim 8, wherein the sliding collar and the second shaft section have wheel-side and axle-side shifting claws facing toward one another axially, the cylindrical sliding collar outer circumference merges into the larger-diameter shifting claws while forming an inner corner region, and the actuator sleeve is arranged in the inner corner region.

11. The drive device as claimed in claim 7, wherein the actuator sleeve is configured to be adjustable by the actuator between:
an open position, in which the formfitting clutch is open, and
a closed position, in which the actuator is configured to interacts with the actuator sleeve, and outer gear teeth are formed on the outer circumferential side of the sliding collar, which have teeth spaced apart from one another in the axial direction, which are in tooth engagement with a gear wheel of an actuator shaft of an electric motor.

12. The drive device as claimed in claim 11, wherein the sliding collar and the second shaft section have wheel-side and axle-side shifting claws facing toward one another axially, the cylindrical sliding collar outer circumference merges into the larger-diameter shifting claws while forming an inner corner region, and the actuator sleeve is arranged in the inner corner region.

13. The drive device as claimed in claim 7, wherein the sliding collar and the second shaft section have wheel-side and axle-side shifting claws facing toward one another axially, the cylindrical sliding collar outer circumference merges into the larger-diameter shifting claws while forming an inner corner region, and the actuator sleeve is arranged in the inner corner region.

* * * * *